(12) United States Patent
Wagner (10) Patent No.: US 8,126,848 B2
(45) Date of Patent: Feb. 28, 2012

(54) AUTOMATED METHOD FOR IDENTIFYING AND REPAIRING LOGICAL DATA DISCREPANCIES BETWEEN DATABASE REPLICAS IN A DATABASE CLUSTER

(76) Inventor: Robert Edward Wagner, North York (CA)

( * ) Notice: Subject to any disclaimer, the term of this patent is extended or adjusted under 35 U.S.C. 154(b) by 325 days.

(21) Appl. No.: 12/558,922

(22) Filed: Sep. 14, 2009

(65) Prior Publication Data

US 2010/0005124 A1 Jan. 7, 2010

Related U.S. Application Data

(63) Continuation-in-part of application No. 11/952,460, filed on Dec. 7, 2007, now abandoned.

(60) Provisional application No. 60/868,935, filed on Dec. 7, 2006, provisional application No. 61/096,849, filed on Sep. 14, 2008.

(51) Int. Cl.
*G06F 17/30* (2006.01)

(52) U.S. Cl. ........ 707/648; 707/609; 707/691; 707/705; 707/803

(58) Field of Classification Search ................. 707/609, 707/610, 640, 682, 648, 691, 705, 803; 709/217, 709/223; 719/318
See application file for complete search history.

(56) References Cited

U.S. PATENT DOCUMENTS

| | | | |
|---|---|---|---|
| 5,956,489 A | | 9/1999 | St. Andres |
| 5,974,425 A | * | 10/1999 | Obermarck et al. .......... 707/682 |
| 6,014,669 A | * | 1/2000 | Slaughter et al. ............. 707/610 |
| 6,122,630 A | | 9/2000 | Strickler |
| 6,473,794 B1 | * | 10/2002 | Guheen et al. ................ 709/223 |
| 6,523,036 B1 | | 2/2003 | Hickman |
| 6,662,196 B2 | | 12/2003 | Holenstein |
| 6,745,209 B2 | | 6/2004 | Holenstein |
| 6,898,609 B2 | | 5/2005 | Kerwin |
| 7,003,531 B2 | | 2/2006 | Holenstein |
| 7,020,697 B1 | * | 3/2006 | Goodman et al. ............ 709/223 |
| 7,103,586 B2 | | 9/2006 | Holenstein |
| 7,113,938 B2 | | 9/2006 | Highleyman |
| 7,177,866 B2 | | 2/2007 | Holenstein |
| 7,194,488 B2 | | 3/2007 | Highleyman |
| 7,231,391 B2 | | 6/2007 | Aronoff |
| 7,321,904 B2 | | 1/2008 | Holenstein |
| 7,366,768 B2 | * | 4/2008 | Deo et al. ...................... 709/217 |
| 7,565,661 B2 | * | 7/2009 | Sim-Tang ..................... 719/318 |
| 2002/0194015 A1 | | 12/2002 | Gordon |
| 2003/0182264 A1 | * | 9/2003 | Wilding et al. ............... 707/705 |

(Continued)

OTHER PUBLICATIONS

Torp, K et al., "Efficient differential timeslice computation", IEEE Transaction on Knowledge and data Engineering, vol. 10, Issue: 4, pp. 599-611, 1998.*

(Continued)

*Primary Examiner* — Shahid Alam
(74) *Attorney, Agent, or Firm* — Dimock Stratton LLP; Alan Macek (57) ABSTRACT

A method and system for monitoring and maintaining the consistency of replicated databases in a shared-nothing database cluster architecture is presented. The method involves the continuous monitoring of the database transaction logs that are maintained by the autonomous database managers that manage the individual database replicas in the cluster. In the event that data discrepancies are detected via the comparison of the transaction logs of the individual database replicas, remedial action is carried out according to configured rules in the main cluster controller. These remedial actions may include, but are not limited to, making a database node inactive within the cluster, or automatically repairing any data discrepancies that are detected among the database replicas in the cluster.

10 Claims, 3 Drawing Sheets

U.S. PATENT DOCUMENTS

| | | | |
|---|---|---|---|
| 2005/0004952 A1* | 1/2005 | Suzuki et al. | 707/609 |
| 2005/0021567 A1 | 1/2005 | Holenstein | |
| 2006/0200501 A1 | 9/2006 | Holenstein | |
| 2006/0200533 A1 | 9/2006 | Holenstein | |
| 2006/0242297 A1 | 10/2006 | Aronoff | |
| 2006/0259525 A1 | 11/2006 | Bae | |
| 2007/0027896 A1* | 2/2007 | Newport et al. | 707/803 |
| 2007/0061379 A1 | 3/2007 | Wong | |
| 2007/0100912 A1 | 5/2007 | Pareek | |
| 2007/0130220 A1* | 6/2007 | Baba et al. | 707/640 |
| 2007/0203910 A1 | 8/2007 | Ferguson | |
| 2007/0226220 A1 | 9/2007 | Aronoff | |
| 2007/0226277 A1 | 9/2007 | Holenstein | |
| 2007/0299885 A1 | 12/2007 | Pareek | |

OTHER PUBLICATIONS

Qin Xiiongpai et al., "A Parallel Recovery Scheme for Update Intensive Main Memory Database Systems", PDCAT 2008, Ninth International Conference on Parallel and Distributed Computing, Application and Technologies, 2008, pp. 509-516.*

Continuent™ uni/cluster for MySQL®, version 2006; High Availability, Scalability and Manageability for MySQL®; Overview Whitepaper.

Continuent™ uni/cluster for PostgreSQL,version on 2006; High Availability, Scalability and Manageability Services for PostgreSQL; Overview Whitepaper.

How Does Double-Take® Ensure Data Integrity, White Paper; Published: Oct. 2006.

Active-Active Configurations Using Transactional Data Management; Key Considerations and Best Practices for Conflict Detection and Resolution; Publication Date: Apr. 10, 2006.

Active-Active Load Balancing With Microsoft SQL Server; Jan. 2007.

Asynchronous Replication Engines; Nov. 2006.

Transaction Replication; Feb. 2007.

Collision Detection and Resolution; Apr. 2007.

Flexible Availability Options with GoldenGate's Transactional Data Managment Platform (TDM); The Availability Digest; Feb. 2007; Sobers Associates Inc.

* cited by examiner

AUTOMATED METHOD FOR IDENTIFYING AND REPAIRING LOGICAL DATA DISCREPANCIES BETWEEN DATABASE REPLICAS IN A DATABASE CLUSTER

CROSS-REFERENCE TO RELATED APPLICATIONS

This application is a continuation of application Ser. No. 11/952,460, filed Dec. 7, 2007.

REFERENCE TO PRIOR APPLICATIONS

This application claims benefits of U.S. Provisional Patent Application Ser. No. 61/096,849 filed Sep. 14, 2008 and of U.S. patent application Ser. No. 11/952,460 filed Dec. 7, 2007, the contents of which are hereby incorporated herein by reference.

FIELD OF THE INVENTION

This invention relates to databases. In particular, this invention relates to identifying and repairing discrepancies between databases.

BACKGROUND OF THE INVENTION

Strategies have been developed for improving the performance of databases with respect to query (i.e. read only) and transactional (i.e. data update/insertion/deletion) performance in databases.

One strategy is to employ a multi-node cluster of shared-nothing database servers that are each running standard, off-the-shelf, relational database management system software. Software implementing relational database management system (RDBMS) software is available from a number of sources including from Oracle Corporation, International Business Machine Corporation, Microsoft Corporation, and Sybase Inc.

Typically, RDBMS software generates a transaction log of transactions on the database. The transaction log is generally used for database backup and recover operations.

A 'shared-nothing' architecture means that each database node in the cluster shares a minimum of resources with other database nodes. In a shared-nothing architecture, the failure of a database node has little or no effect on the other database nodes in the system.

Generally, the cluster of database nodes is coordinated by a separate cluster controller that resides in an architectural tier between the database nodes and the client computers that are accessing the database servers. In this architecture, the cluster controller virtualizes the cluster of standalone database servers such that they appear as a single database server to the client computers. This strategy generally works very well for improving query performance over a single implementation of the database system, but typically offers little benefits for improving transactional performance. The system may be scaled up to handle larger query loads by adding additional database nodes to the cluster. The database nodes may also be separated physically to improve disaster recovery of the system.

A shared-nothing database cluster is typically used with repositories of data that are subject to frequent query activity and occasional transactional activity (insertions, modifications, deletions). As an example, an electronic commerce website may maintain a database that contains data on the available items offered for sale and which responds to inquiries regarding availability and pricing. Typically the data contained in the database would be updated relatively infrequently compared to the rate at which the data is queried by customers.

BRIEF DESCRIPTION OF THE DRAWINGS

In drawings which illustrate by way of example only a preferred embodiment of the invention.

DETAILED DESCRIPTION OF THE INVENTION

Figure 1:
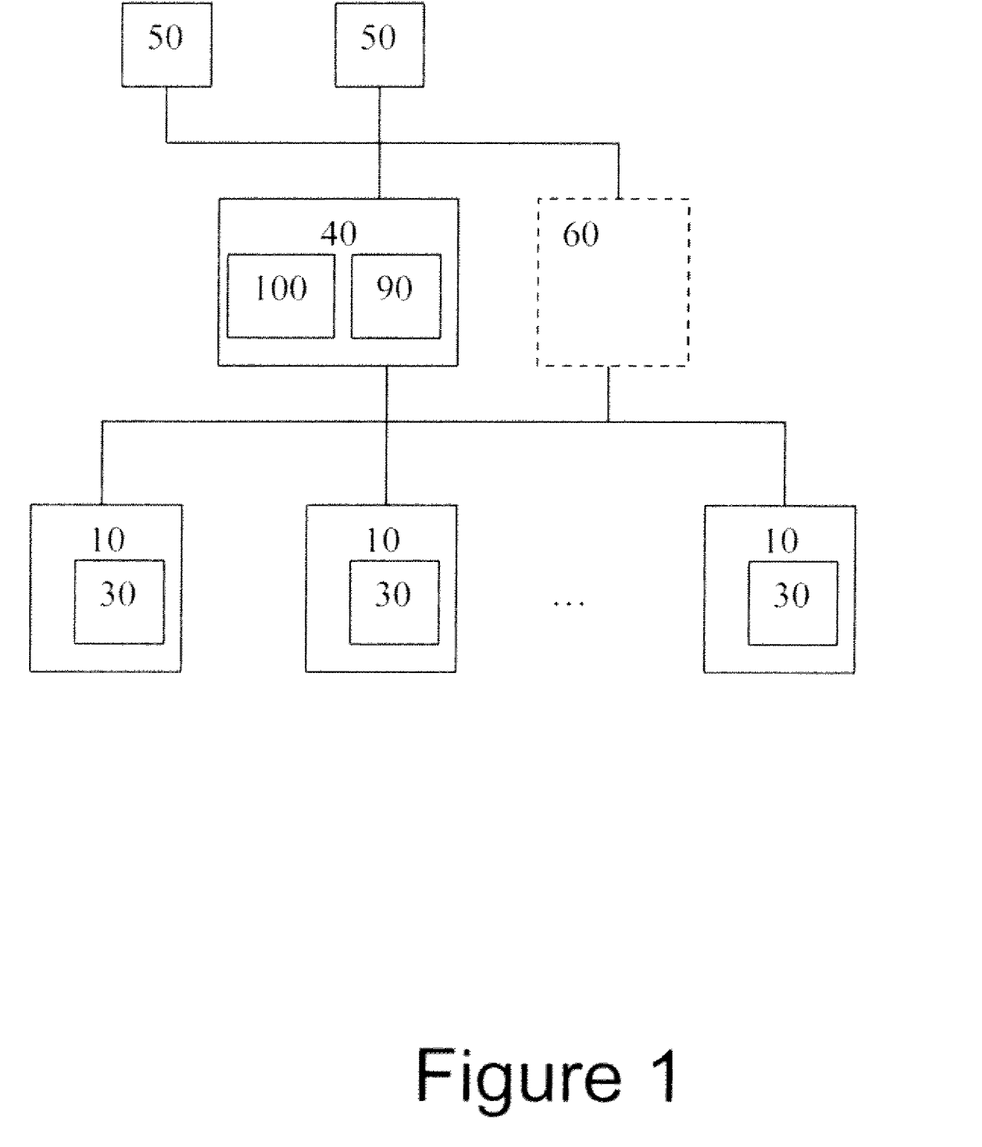
FIG. 1 is a schematic representation of an equal-peer architecture embodiment of the invention.

In an equal-peer architecture, the multi-node cluster 1 of shared-nothing database nodes 10 comprises a number of architectural elements as shown in FIG. 1 including a set of two or more database nodes 10. Each of the database nodes possesses a separate collection of relational or otherwise structured data connected by a communication network 20. Each node may be running standard, off-the-shelf, RDBMS software and each one of these nodes 10 is self-contained, with each node running, its own instance of RDBMS software, and independently managing its own databases 30 within the cluster. Preferably, each database node 10 shares minimal resources with the other database nodes 10 in the cluster 1. The nodes may be on separate physical hardware or separate virtual nodes on a larger computer.

A cluster controller 40 manages the interactions that occur between the database nodes 10 in the cluster and the various database client nodes 50 that need to read data from the cluster 1, and that need to modify data residing in the cluster 1. To improve the reliability of the system, a standby cluster controller 60 may be employed to automatically take over from the primary cluster controller 40 in the case that the primary cluster controller fails for any reason, including hardware or software failure.

The communication network 20 allows the cluster controller 40 to communicate with the database nodes 10 in the cluster 1, and that allows client nodes 50 to access the virtualized database presented by the cluster controller 40. An Ether et network may be used for such a communication network.

Each database node 10 in the cluster maintains a complete, separate database 30 that is expected to be logically identical to that maintained by the other nodes in the cluster 1 (assuming that all database nodes 10 in the cluster 1 have had the same set of transactions applied by the cluster controller 40).

Therefore, it is appropriate to state that each database 30 in the cluster is replicated by a factor that is equal to the number of database nodes 10 in the cluster 1. In other words, the same data is represented in each of the databases contained within each of the database nodes 10. All the databases 30 that are part of the cluster configuration are termed replicated databases and an individual instance of each replicated database 30 on each database node 10 is termed a database replica.

Normally, there is no direct interaction between the database nodes 10 in the cluster 1 and the client nodes 50 that need to access the data that resides in the database nodes 10. Instead, such interactions between the client nodes 50 and the database nodes 10 are mediated by the cluster controller 40. The details of the architecture may not be known to the client nodes 50 and the cluster controller 40 effectively allows the client nodes 50 to interface with the multiple database nodes 10 as a single virtual database server.

When a client node 50 wishes to query the virtualized database, the query is submitted to the cluster controller 40. The cluster controller 40 submits this request to only one of the database nodes 10 in the cluster 1. Typically, the controller uses a load-balancing algorithm to select a single database node to execute the query from among the nodes that are known to be most transactionally up-to-date with respect to the other nodes in the cluster. The node 10 that is selected by the cluster controller 40 may be selected on the basis of optimal response time to the query.

When a client node wishes to apply a transaction to a database, such as inserting data, updating existing data, or deleting data from the virtualized database, the transaction is submitted to the cluster controller 40. The cluster controller 40 passes this request on to all of the database nodes 10 in the cluster 1 for execution. The same transaction is performed on all of the instances of the database 30 contained in each of the database nodes 10. The intent of this parallel update process is to keep the database replicas 30 in the cluster as close to identical as possible over time.

When the cluster controller 40 applies a transaction to all of the database nodes 10 in the cluster 1 the controller 40 monitors the outcome of the transaction from each database node 10. In general, each database node 10 will return a result to the cluster controller 40 consisting of a count of the number of table rows affected by the transaction and any error/warning status codes that apply to the transaction. Thus, if all database nodes in the cluster return the same row count for a particular transaction, the cluster controller typically assumes that all database replicas have been identically updated by the transaction.

Typically the cluster controller 40 is responsible for keeping track of the transactional state of each database replica in each database node 10 such as which transactions have been initiated, which transactions have been completed, and the final result of each transaction. Based on the transactional state of each database node 10, the cluster controller 40 can determine which database nodes 10 are most up to date, and which are therefore candidates for handling a query when such a request is received from a client node 50.

As an example, the Java Database Connectivity (JDBC™) 3.0 Specification (Dec. 1, 2001) may be used as the protocol between the cluster controller 40 and the database nodes 10. This specification indicates that when the execute method is used to run a query or a transaction, the method returns true if the first result is a ResultSet object (i.e. for a query) and false if the first result is an update count (i.e. for a transaction). Then, additional methods must be called to retrieve the ResultSet object (e.g. the method getResultSet), or to retrieve the update count (e.g. the method getUpdateCount), or to retrieve additional results, if any, from the database node 10.

Master/Slave Architecture

Figure 2:
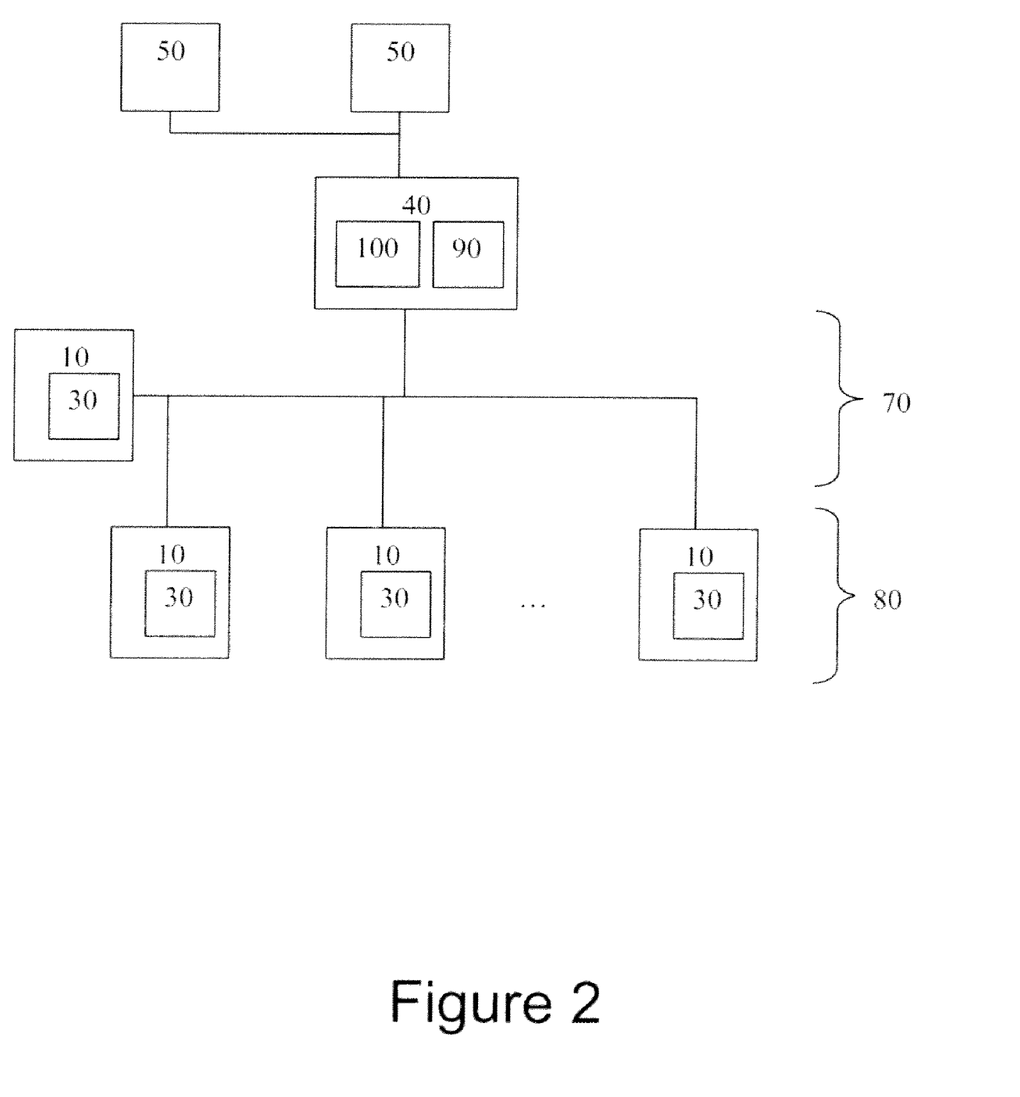
FIG. 2 is a schematic representation of a master/slave architecture embodiment of the invention.

In a master slave topology as shown in FIG. 2, one of the database nodes 10 is designated as the master database node 70. As in the equal-peer topology described earlier, the cluster 1 contains two or more database nodes 10 running standard, off-the-shelf, relational database management system (RDBMS) software. Each one of these nodes is self contained, with each node 10 running its own instance of RDBMS software, and independently managing its own databases 30 within the cluster.

The master database node 70 is responsible for handling transaction requests from client nodes 50, and propagating all resulting data content changes to the other database nodes 10 in the cluster, termed slave database nodes 80, each of which host one or more slave database replicas. The master database node 70 hosts one or more master databases. All data updates are applied to the slave database nodes 80 (via the master node 70) only after the data updates have been applied to the master database node 70.

Figure 3:
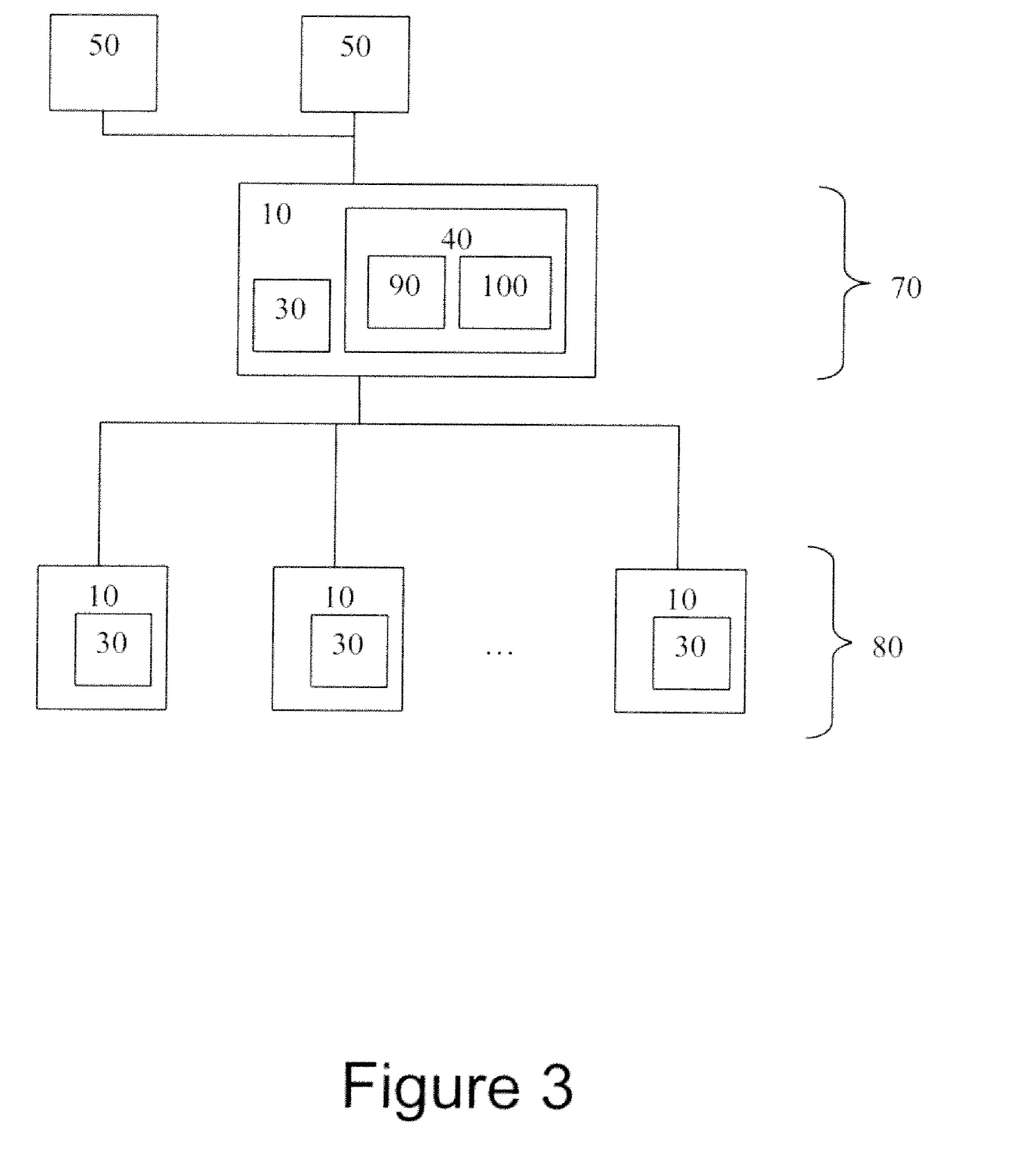
FIG. 3 is a schematic representation of a master/slave architecture embodiment of the invention with the master node operating as the cluster controller.

The cluster 1 contains a cluster controller 40 that manages the interactions that occur between the database nodes 10 in the cluster 1 and the various client nodes 50 that read data from the cluster 1, and that modify data residing in the cluster. The functions of the cluster controller 40 may either be performed by a separate node that does not host any database replicas, as shown in FIG. 2, or by the master database node 70 itself in which case a cluster controller 40 would be contained within the master database node 70, as shown in FIG. 3.

Each database node 10 in the cluster maintains a complete set of database data 30 that is expected to be logically identical to that maintained by the other nodes in the cluster 1, assuming that all slave database nodes 80 in the cluster 1 have received and applied all the replicated data changes from the master database node 70.

Therefore, it is appropriate to state that each database 30 in the cluster is replicated by a factor that is equal to the number of database nodes 10 in the cluster 1. In other words, for a given database 30, the same data is represented in each of the database nodes 10.

As in the equal-peer topology, there is normally no direct interaction between the database nodes 10 in the cluster 1 and the client nodes 50 that need to access the data that resides in the database nodes 10. Instead, such interactions between the client nodes 50 and the database nodes 10 are mediated by the cluster controller 40, or by the master database node 70 if the function of the cluster controller 40 is performed by the master database node 70.

When a client node 50 wishes to query the virtualized database, the query is submitted to the cluster controller 40. The cluster controller 40 submits this request to only one of the database nodes 10 in the cluster 1. Typically the controller uses a load-balancing algorithm to select a single database node to execute the query from among the nodes that are known to be most transactionally up-to-date with respect to the other nodes in the cluster. By definition, the master database node 70 is always the most transactionally up to date, but slave database nodes 80 may be equally as up to date and be selected by the cluster controller 40 for receiving a query.

When a client node wishes to apply a transaction to a database, such as inserting data, updating existing data, or deleting data from the virtualized database, the transaction is submitted to the cluster controller 40. The cluster controller 40 passes this request on to the master database node 70. The master database node then propagates any changes to the database to the slave database nodes 80. In this way, the slave databases are maintained closely synchronized with the master database node 70.

The controller 40 typically monitors the outcome of a transaction from each database node 10. In general, each database node 10 will return a result to the cluster controller 40 consisting of a count of the number of table rows affected by the transaction and any error/warning status codes that apply to the transaction. Thus, if all database nodes in the cluster return the same row count for a particular transaction, the cluster controller typically assumes that all database replicas have been identically updated by the transactions. By monitoring the transactional state of each slave database node 80, the cluster controller can select which database node 10 should execute a query when a query is received from a client node 50.

Transaction Log Monitoring

Transactions (or other data loading actions that involve the modification of data) applied to a particular database node 10 without involving the cluster controller 40 can lead to data discrepancies between the database replicas 30 in the cluster 1. There is also the potential that implementation faults in the replication algorithm of the cluster controller 40 or master database node 70 could lead to unanticipated data discrepancies between the database replicas. Even a single row added to a database table that is not replicated across the other database nodes 10 could have serious consequences to the accuracy and consistency of both queries and transactions that are handled by the cluster 1. Logical data differences between database replicas may arise from hardware or software failures, communication interruptions between the nodes 10 in the cluster 1 or failure modes involving one or more of the nodes 10 in the cluster 1

A transaction log is generally maintained by the RDBMS database software that runs within each database node 10. The transaction log is generally exclusively written to by the RDBMS database software and is distinct from any logs that are maintained by the cluster controller 40. The transaction log records the exact details of each logged update or modification of data within the associated database. The transaction log completely specifies all logged data changes that have been applied to the associated database since the transaction log was last initialized or re-initialized.

In the preferred embodiment a monitoring subsystem 90 operates on the cluster controller 40 and monitors the detailed content of the database transaction log of each database replica 30 within each database node 10 of the cluster 1. Each database replica 30 in a database node 10 has a separate transaction log.

When the cluster controller 40 sends a transaction request to a database 30 in a particular database node 10 the monitoring subsystem 90 notes the contents of the database's transaction log. After the requested transaction has been completed for the database 30, the monitoring subsystem 90 again notes the contents of the database's transaction log and determines the details of the database changes as a result of the transaction.

All the incremental database transaction log changes obtained by the monitoring subsystem 90 are stored at the cluster controller 40 with unique transaction identification information provided by the cluster controller 40.

After multiple database replicas 30 have completed the same transaction, as directed by the cluster controller 40, the cluster controller examines the incremental changes of each database transaction log as identified by the monitoring subsystem 90. In general, the transaction log changes are expected to be identical for each database node 10 that completes the same transaction, so if any discrepancies are identified, remedial actions may be initiated by the cluster controller 40.

In an equal-peer architecture, one such remedial action may be to take a particular database replica 30 off-line within the cluster if the transaction log monitoring results associated with the particular database replica are different from the common result yielded by a majority of the other replicas of the database running within other database nodes 10 of the cluster 1. After a database replica is taken off-line in the cluster, the cluster controller 40 no longer sends query or transaction requests to the off-line replica, but the remaining on-line replicas of the same database 30 in the cluster continue to service query and transaction requests from the cluster controller 40. Each database 30 within a database node 10 may be off-line or on-line as determined by the cluster controller 40.

In a master/slave architecture, a remedial action may be to take a particular slave database replica 30 in a slave database node 80 off-line within the cluster if the transaction log monitoring results associated with the particular slave database replica 30 are different from the results associated with the master database node 70 of the cluster 1. After a slave database replica is taken off-line in the cluster, the cluster controller 40 no longer sends query or transaction requests to the off-line replica, but the remaining on-line replicas of the same database 30 in the cluster continue to service query and transaction requests from the cluster controller 40.

In general another remedial action may be to send a notification event to an operational console of the cluster system to alert a human operator, or possibly to other enterprise monitoring systems in communication with the cluster 1.

If the discrepancy is associated with a table field that represents a database-generated timestamp, another remedial action may be to synchronize the value of the timestamp between the database nodes 10. Synchronization may be done by selecting the earliest timestamp from those in other database nodes 10.

If the monitoring subsystem 90 identifies a transaction log change that does not correlate with any transaction that is orchestrated by the cluster controller 40, this is an indication that a database transaction has been applied to the database replica without involvement of the cluster controller 40. Remedial action may be taken by the cluster controller, including taking the database replica 30 with the unexpected transaction off-line or sending a notification event to the operational console or other monitoring systems.

It is understood that the cluster controller 40 and monitoring subsystem 90 can be configured such that certain types of cross database discrepancies detected by the cluster controller 40 are ignored. For example, it may be acceptable to ignore discrepancies that occur in certain database tables; likewise, discrepancies in certain table columns may be considered to be normal and acceptable, or to have no significant impact on the overall data integrity of the database cluster. The configuration of which discrepancies are ignored may be altered by an operator and persist after restarting a database node. An example of a discrepancy that may be ignored is a timestamp representing when a database was modified for auditing purposes. If such a timestamp is not used directly or indirectly by other internal functions of the database, or by external applications that use the database, it may be acceptable that the timestamps be different as between the database replicas 30. A temporary table used for recording intermediate results is another example of a discrepancy that may be ignored if the contents of the temporary table are not used after the final outcome is derived. Such a temporary table may not be monitored for discrepancies.

Any discrepancies detected by the cluster controller 40 and any remedial action taken may be logged to a persistent alerts log file. The alerts log file may be subject to analysis to understand what discrepancies arose in order to try to avoid discrepancies arising in the future.

The monitoring subsystem 90 may maintain a persistent state file to provide a record of the state of each transaction log at the time of the last shutdown of the cluster controller 40. When the cluster controller 40 is re-started, by comparing the state file that applies for each transaction log with the current contents of each transaction log, the monitoring subsystem 90 is able to determine if any databases have been modified by processes that were not orchestrated by the cluster controller 40, while the cluster controller 40 was not available. Databases with inconsistencies may be taken off-line.

In one embodiment the cluster controller 40 may communicate with the monitoring subsystem 90 regarding transactions. When the cluster controller 40 is ready to send a transaction request to a database replica 30, R1, in a particular database node 10, it first checks if there are any other in-progress transactions for the database replica R1. If there are no in-progress transactions, the cluster controller 40 alerts the monitoring subsystem 90 to note the current state of the transaction log for the database replica R1. After the monitoring subsystem 90 determines the current state of the necessary transaction log it sends a message to the cluster controller 40 that the state has been noted. The cluster controller 40 then dispatches the pending transaction request to the target database node 10. By this process any further additions to the transaction log can be readily determined.

When a transaction is completed for database replica 30, R1 the cluster controller 40 checks if there are any other in-progress transactions for the database replica 30, R1. If not, the cluster controller 40 asks the monitoring subsystem 90 to re-examine the state of the transaction log for the database replica 30, R1, and to report back on the details of all data changes that have taken place since the state was earlier determined. After the monitoring subsystem 90 reports back to the cluster controller 40 on the detected data changes in the transaction log, the cluster controller 40 saves the data change details along with the list of transactions that were responsible for causing the detected data changes. The cluster controller 40 then continues with other pending query and transaction requests for the database node 10.

If there are in-progress transactions for the database replica 30, R1 when the transaction request is completed, the cluster controller 40 does not ask the monitoring subsystem to re-examine the state of the transaction log for the database replica 30, R1, since other transactions in progress may affect the transaction log. Instead, the cluster controller continues sending query and transaction requests to the database node.

After a set of two or more database replicas 30 in different database nodes 10 have completed the same set of transactions as managed by the cluster controller 40, and the cluster controller 40 has incremental data changes that apply for the common transactional state as reported by the monitoring system, the cluster controller can determine if the data content of the database replicas 30 are the same. If any discrepancies are identified, remedial actions can be initiated by the cluster controller 40.

If the monitoring subsystem 90 detects changes to a particular transaction log, and the monitoring subsystem 90 has not been notified by the cluster controller 40 that one or more transactions are in progress for the associated database replica 30, this likely indicates that a database transaction has occurred, or is in progress, on the particular database replica 30 without the involvement of the cluster controller 40. In this case, remedial actions can be initiated by the cluster controller 40.

For use with some database software, an embodiment of the invention includes using database triggers as an alternative to a transaction log to monitor activity of database nodes. In this alternative embodiment, table triggers are created and associated with each table in each database 30 that may be affected by transaction requests Three triggers are preferably created. An insert trigger is invoked by the database software each time a new row or record is added to the table associated with the trigger. An update trigger is invoked each time the data content of a row or record is updated or modified in the table associated with the trigger. Two separate update triggers would be used in tandem, one to record the content of the updated record prior to the update, and one to record the content of the updated record after the update. A delete trigger is invoked each time a row or record is deleted from the table associated with the trigger. As a result of any of the triggers being invoked, a message is logged to the alternative log containing information about the change. The logged information may include the name and identifier of the database replica 30, a timestamp indicating the date and time of the data modification, the name of the affected table and the details on the data being added, deleted or modified in the table.

The alternative log for a database replica 30 may be maintained as a persistent file at the database node 10 or kept as a table within the database replica 30 itself, or in an other database associated with the database node 10.

In a further embodiment, the cluster controller may communicate directly with the RDBMS software running within the database nodes 10 to directly obtain information about what transactions have been completed and what tables and data have been modified as a result of a given transaction. This type of RDBMS functionality is often termed "writeset extraction", and is not commonly available for commercial RDBMS software packages. For example, when a new data record is added, the cluster controller may obtain information on the name of the affected table and the exact details of all the data added to the affected table. When existing data is removed from the database as a result of the transaction, the name of the affected table and the details of all data removed from the affected table are obtained by the cluster controller. Similarly, when a database record is modified, the name of the affected table and details of the modified data in the affected table, including before and ater values for all the fields in the record are made available to the cluster controller. For large data fields, checksums or size information may be used rather than the entire contents of the field. Under this embodiment, the transaction logs are not monitored by the cluster controller 40, and the desired data-change information is obtained directly by the cluster controller 40 from the RDBMS software running within the database nodes 10.

Having the cluster controller 40 use the mechanism of writeset extraction, if supported by the RDBMS software, to monitor the database content changes may not yield all of the information that is available to the cluster controller 40 when RDBMS transaction logs are monitored. For example, data changes in a node 10 that are made without involvement of the cluster controller 40 may not be detected by the cluster controller 40 using the writeset extraction mechanism.

In one embodiment, both transaction log monitoring through the monitoring subsystem 90 and writeset extraction, if supported by the RDBMS software are used in tandem to yield a method for detecting data discrepancies between databases that is possibly more complete or efficient than using only one of transaction log monitoring or writeset extraction.

Automating the Repair of Database Discrepancies

In previously discussed embodiments of the cluster controller 40 working in tandem with the transaction log monitoring subsystem 90 to identify data discrepancies between database replicas 30 in the cluster 1, a number of possible remedial actions were presented for dealing with identified data discrepancies, including but not limited to, automatically taking a database replica 30 off-line within the cluster.

In an additional embodiment, automated voting and data repair algorithms are implemented in the cluster controller 40 to allow a replica (or replicas) 30 exhibiting data discrepancies with respect to the other database replicas 30 in the cluster to be automatically or semi-automatically repaired and restored to an active, on-line state within the cluster 1.

The voting and data repair mechanisms described below are directed to addressing the following criteria: a) over time, all database replicas 30 within the cluster 1 are kept synchronized with respect to data content; b) the occurrence of cascading data discrepancies within a replica 30 is minimized; c) where possible, majority-based voting logic is implemented among the various replicas 30 in the cluster 1 to determine the "correct" result for each transaction. A cascade of data discrepancies occurs when a particular transaction within a replica 30 results in a data discrepancy that causes additional data discrepancies to occur in the replica 30 for subsequent transactions executed within the replica.

In a database cluster 1 that implements an equal-peer architecture, and where transactions are asynchronously applied to each database node 11 in the cluster 1, the cluster controller 40 effectively maintains a separate transaction queue for each node 10. In this case, each node 10 is generally free to proceed through its queue of transactions at its own pace, and nodes 10 with more computational power will tend to be more transitionally up-to-date than other database nodes 10 in the cluster 1 with less computational power. In such a cluster, if the desire exists to implement majority-based voting to determine the correct outcome of each transaction, than certain measures must be taken to prevent cascading data discrepancies, as outlined below.

Conversely, in a database cluster 1 that implements an equal-peer architecture, and where transactions are synchronously applied to each database node 10 in the cluster 1, the cluster controller 40 effectively maintains a single transaction queue for all nodes 10 in the cluster 1, and each transaction is not finally committed within the cluster 1 until all active nodes 11 in the cluster 1 have completed the transaction. In this case, all database nodes 10 in the cluster 1 will always be equally up-to-date with respect to completed (i.e. committed) transactions, regardless of the amount of computational power in each node 10. Therefore, if majority-based voting is used to determine the correct outcome of each transaction in an equal-peer architecture that implements synchronous transaction replication no special measures are generally required to prevent cascading data discrepancies.

As an example, for the case of an equal-peer architecture consider the situation where the data content of a database replica 30 is modified without involvement of the cluster controller 40, and this condition is detected by the fact that the transaction log for the affected replica indicates unexpected data changes that cannot be correlated with any transaction initiated by the cluster controller 40. In this case, the following data repair logic is implemented in the cluster controller 40 for repairing the affected replica 30 a. The affected database replica 30 is temporarily taken off-line (i.e. is made inactive) within the cluster 1.

b. After the affected replica 30 exhibits no further data changes over a configurable time period (e.g. 1 minute), as determined by the transaction log monitoring subsystem 90 examining the transaction log of the affected replica 30, the unexpected data content changes in the affected replica 30 are reversed. The data repair transactions that implement the reversal of the unexpected data changes are performed in reverse chronological order compared to the original unexpected data changes logged in the transaction log of the affected replica 30. It is preferable that triggers be temporarily disabled on all tables that need to be modified by the data repair transactions (excluding any special triggers being used to create an alternate transaction log for each replica 30, if employed), while the repair actions are being performed so that repairs made to the tables are not replicated to other tables or databases. Then, after the repair actions are completed, the disabled triggers can be re-enabled. In general, depending upon how the cluster 1 is configured, the repair actions can be done either automatically by the cluster controller 40, or by the controller 40 following authorization from a human operator acting upon an alert sent to the system management interface of the cluster 1.

c. After the repair actions are completed, the affected replica 30 is brought on-line again (i.e. is made active) within the cluster 1.

The data repair mechanism described above may need to implement special measures for database tables with auto-incrementing fields, especially when the repair mechanism must reverse the following types of data modifications for these tables: one or more new records were added to a table, and the new rows must be deleted; or one or more records were deleted from a table, and these rows must be restored. For these cases, the data repair mechanism must ensure that the auto-incrementing fields behave identically in the repaired replica 30 as compared with the other database replicas 30 in the cluster 1.

For the case of an equal-peer architecture in the situation where data discrepancies are observed to occur among the various replicas 30 in the cluster 1 following the completion of a transaction initiated by the cluster controller 40. For a cluster 1 consisting of N active replicas 30, where N is a number greater than two (2), voting and data repair algorithms can be implemented in the cluster controller 40 as follows.

In the event of said data discrepancies among the N active database replicas 30, the correct set of data content changes following the application of one or more transactions to all N active replicas 30 can be decided by determining if a common set of data changes apply for the majority of active replicas 30 in the cluster 1 (i.e. majority-based voting). If a majority result can be determined, then the following data repair logic can be implemented in the cluster controller 40 for repairing the defective replicas 30 that demonstrate data content changes that do not agree with the majority result within the cluster 1:

a. The defective database replicas 30 that need to be repaired are temporarily taken off-line (i.e. are made inactive) within the cluster 1, and are assigned a special state termed IN_REPAIR. As detailed below, if an IN_REPAIR replica is more transactionally up-to-date than other replicas 30 in the cluster 1, it will continue to participate in voting activities while in the IN_REPAIR state, with respect to any transactions that it has completed.

b. The data content of each defective replica 30 is modified by a set of data repair transactions, such that after the repair transactions are completed, the data content of each repaired replica 30 is consistent with the previously determined majority result within the cluster 1. It is preferable that triggers be temporarily disabled on, all replica tables that need to be modified by the data repair transactions (excluding any special triggers being used to create an alternate transaction log for each replica 30, if employed), while the repair actions are being performed so as to limit any data changes resulting from the repair actions to only those data chances required to repair the data discrepancies originally identified by the monitoring subsystem 90. Then, after the repair actions are completed, the disabled triggers can be re-enabled.

In general, depending upon how the cluster 1 is configured, the repair actions can be done either automatically by the cluster controller 40, or by the controller 40 following authorization from a human operator acting upon an alert sent to the system management interface of the cluster 1. A replica 30 may be assigned a special state IN_REPAIR_WAITING by the cluster controller 40 when human authorization of a repair action is pending for the replica 30. After human authorization is obtained for the outstanding repair action, the replica state is changed from IN_REPAIR_WAITING to IN_REPAIR.

c. After the repair actions are completed, the repaired database replicas 30 are brought on-line again (i.e. are made active) within the cluster 1 according to the following logic: If a particular repaired replica 30 (referred to as Replica_1) with state IN_REPAIR is not more transactionally up-to-date than any other replica 30 in the cluster 1 with state IN_REPAIR or active, then Replica_1 is immediately returned to active state in the cluster 1. However, if a particular repaired replica 30 (denoted as Replica_2) with state IN_REPAIR is more transactionally up-to-date than one or more replicas 30 in the cluster 1 with state IN_REPAIR or active, then Replica_2 with state IN_REPAIR remains in that state within the cluster 1 until all other IN_REPAIR and active replicas 30 in the cluster 1 are as transactionally up-to-date as Replica_2. Then, Replica_2 is made active again in the cluster. Note that while Replica_2 is maintained in the IN_REPAIR state, it participates in voting activities for the transactions that it has completed, and it may undergo multiple iterations of repair while it is maintained in the IN_REPAIR state. The above measures have been incorporated in order to limit the occurrence of cascading data discrepancies within any one replica 30.

As an example of the above data repair mechanism applied to an equal-peer cluster with asynchronous statement replication among the database replicas 30, consider a three-node cluster for which all three nodes are initially equal in data content.

i. A transaction T1 is applied to all three nodes, causing the same table record field F to be updated from a value of A to B in all three database replicas R1, R2, and R3. In this case, all three transaction logs L1, L2, and L3 record the same change for field F from value A to B.

ii. Next, transaction T2 is applied to all three nodes, causing the field F to be updated from a value of B to C in database replicas R1 and R2, and from a value of B to D in replica R3. In this case, transaction logs L1 and L2 record the same change for field F from value B to C, while lot L3 records a change for field F from B to D.

iii. Next, transaction T3 is applied to replica R3, prior to it being applied to replicas R1 and R2. Transaction T3 causes the field F to be updated from a value of D to E in replica R3, and log L3 records a change for field F from D to E.

iv. Meanwhile the data discrepancy resulting from transaction T2 is detected, and replica R3 is put into state IN_REPAIR. Based on the majority value of C for field F for transaction T2 obtained from replicas R1 and R2, the value of field F in replica R3 is changed from E to C, and log L3 records a change for field F from E to C, and C becomes the new terminal value for field F in replica R3 for transaction T3. Since replica R3 is still transactionally more up-to-date than replicas R1 and R2, R3 stays in the state IN_REPAIR.

v. Next, transaction T3 is applied to replicas R1 and R2. Transaction T3 causes the field F to be updated from a value of C to D in replicas R1 and R2, and logs L1 and L2 record a change for field F from C to D. On the other hand, the latest terminal value for field F from replica R3 for transaction T3 is the value C (which is the repair value applied for transaction T2).

vi. The data discrepancy resulting from transaction T3 is detected, and replica R3 is maintained in the state IN_REPAIR. Based on the majority value of D for field F for transaction T3 obtained from replicas R1 and R2, the value of field F in replica R3 is changed from C to D, and log L3 records a change for field F from C to D. Since replica R3 is now fully repaired, and is no longer more transactionally up-to-date than replicas R1 and R2, it is made fully active in the cluster again.

In majority-based voting systems, the greater the number of voting members in the system, the higher the fault tolerance of the system. Therefore, in a database cluster 1 implementing majority-based voting logic, such as outlined above, it is preferred that a minimum of four (4) database nodes 10 be part of the cluster 1, such that three (3) voting nodes 10 are maintained in the event that one of the nodes 10 is put off-line by the cluster controller 40.

The data repair mechanism described above may need to implement special measures for database tables with auto-incrementing fields, especially when the repair mechanism involves the following types of data modifications for these tables: one or more new records must be added to a table, or one or more records must be deleted from a table. For these cases, the data repair mechanism must ensure that the auto-incrementing fields behave identically in each repaired replica 30 as compared with the other replicas 30 in the cluster 1.

In general, the data content changes in all repaired database replicas 30 resulting from all data repair actions in the cluster 1 shall be verified by the transaction log monitoring subsystem 90 working in conjunction with the cluster controller 40. This final verification step helps to ensure that inadvertent data content changes are not caused by the data repair actions, for example, due to un-disabled table triggers. In the event that a set of repair actions cannot be successfully completed for a particular replica 30, then the repair process is preferably abandoned for the replica and the replica would be maintained as inactive (but not in the state IN_REPAIR or IN_REPAIR_WAITING) in the cluster 1. Also, a suitable alert would be sent to the system management interface of the cluster 1 to alert human operators of this particular condition and allow for manual repair.

The outcome of all voting and data repair actions in the cluster 1 may be logged to a persistent alerts log file for future reference. Then, following the restoration of an inactive database replica 30 to active state in the cluster 1, the outcome of all voting events that occurred while the replica was inactive can be respected, as recorded in the persistent alerts log file.

For example, if while a database replica 30 (identified as Replica_A) was inactive in the cluster 1, a voting action was carried out that determined the correct data change result of transaction Y to be Result (Y1), and after restoration to active state. Replica_A subsequently yields a data change result for transaction Y of Result (Y2), then Replica_A is repaired such that it respects the previously determined correct voting result of Result (Y1).

In some situations it may not be possible to determine a common set of data changes that apply for the majority of active database replicas 30 in the cluster 1. In this case, additional steps are required to determine the correct set of data content changes following one or more transactions. One option is to consider the correct result to be that from the replica 30 that is most up-to-date in the cluster 1, or that first completed the transaction(s) in question. As a second option, each replica 30 in the cluster may be assigned a unique "authoritativeness index", where an index of "1" represents the most authoritative replica for determining the correct set of data content changes following one or more transactions. In this case, if a majority result cannot be determined, the correct set of data content changes are considered to be those of the replica 30 with the highest authoritativeness index; however, if this replica is off-line or inactive in the cluster, the correct set of data content changes are considered to be those of the replica with an the next highest authoritativeness index, and so on. As an alternate rule, if a data content discrepancy between replicas is associated with a table field that represents a database-generated timestamp, and no majority result applies among the replicas 30, then the cluster controller 40 may synchronize the field for all replicas 30 by selecting the earliest timestamp from among those demonstrated by the various replicas in the cluster 1.

Finally, when data discrepancies are observed among the database replicas 30 in the cluster 1 following one or more transactions, instead of using the majority-based voting logic described earlier to resolve the correct set of data content changes, the cluster 1 may simply be configured to always consider the correct result to be that from the replica 30 that is currently most up-to-date in the cluster 1, or that first completed the transaction(s) in question. Alternately, the cluster 1 may be configured to always consider the authortativeness index of each replica 30 in the cluster 1. In this case the correct set of data content changes are considered to be those of the replica 30 with the highest authortativeness index; however if this replica is off-line (inactive) in the cluster 1, the correct set of data content changes are considered to be those of the replica 30 with the next highest authortativeness index, and so on.

For the case of a master slave architecture, where the data content of a database replica 30 in a slave database node 80 is modified without involvement of the cluster controller 40 via the master database node 70, this condition is detected when the transaction log for the affected slave replica 30 indicates unexpected data changes that cannot be correlated with any transaction initiated by the cluster controller 40. Also, these unexpected data changes in the slave database node 80 cannot be correlated with data changes already made in the master database node 70. Unexpected data changes in a database that resides within the master database node 70 would not be subject to the same repair logic, but it would still cause an alert to be sent to the system management interface of the cluster 1. The following data repair logic is implemented in the cluster controller 40 for repairing the affected replica 30 in the slave database node 80:

a. The affected database replica 30 is temporarily taken off-line (i.e. is made inactive) within the cluster 1. In this case the inactive replica no longer receives replicated data updates from the master database node 70, and no longer handles queries originating from client nodes 50.

b. After the affected database replica 30 exhibits no further data changes over a configurable time period (e.g. 1 minute), as determined by the transaction log monitoring subsystem 90 examining the transaction log of the affected replica 30, the unexpected data content changes in the affected replica 30 are reversed. The delay period for initiating the data repair actions is employed as a way to try to avoid the situation where repair actions are being carried out while unexpected data content changes are still in progress. The data repair transactions that implement the reversal of the unexpected data changes are performed in reverse chronological order compared to the original unexpected data changes logged in the transaction log of the affected replica 30. In general, depending upon how the cluster 1 is configured, the repair actions can be done either automatically by the cluster controller 40, or by the controller 40 following authorization from a human operator acting upon an alert sent to the system management interface of the cluster 1. Table triggers are not generally enabled in slave replicas 30 in a master/slave architecture. The exception is any special triggers being used to create an alternate transaction log for each replica 30, if employed, in which case they are always enabled. Because of this, unlike for equal-peer architectures, no special actions are required to deal with triggers while the data repair actions are being carried out.

c. After the repair actions are completed, the affected database replica 30 is brought on-line again (i.e. is made active) within the cluster 1.

The data repair mechanism described above may need to implement special measures for database tables with auto-incrementing fields, especially when the repair mechanism must reverse the following types of data modifications for these tables: one or more new records were added to a table, and the new rows must be deleted- or, one or more records were deleted from a table, and these rows must be restored. For these cases, the data repair mechanism must ensure that the auto-incrementing fields behave identically in the repaired replica 30 as compared with the other replicas 30 in the cluster 1.

Also for the case of a master/slave architecture consider the general situation where data discrepancies are observed to occur between one or more slave database nodes 80 and the master database node 70 after the application of an equivalent set of transactions to each node being considered. In the master/slave architecture, the master database node 70 is always considered to be authoritative with respect to data discrepancies between a slave node and the master node so the majority-based voting logic that may apply for an equal-peer architecture is not used. The following data repair logic is implemented in the cluster controller 40 for repairing each defective replica 30 residing in a slave database node 80:

a. The defective database replica 30 in a slave database node 80 that needs to be repaired is temporarily taken off-line (i.e. is made inactive) within the cluster 1. In this case, the inactive replica 30 no longer receives replicated data updates from the master database node 70, and no longer handles queries originating from client nodes 50.

b. The data content of the defective database replica 30 is modified by a set of data repair transactions, such that after the repair transactions are completed, the data content of the repaired replica 30 is consistent with that of the master database node 70. In general, depending upon how the cluster 1 is configured, the repair actions can be done either automatically by the cluster controller 40, or by the controller 40 following authorization from a human operator acting upon an alert sent to the system management interface of the cluster 1. Note that table triggers are not generally enabled in slave replicas 30 in a master/slave architecture (with the exception of any special triggers being used to create an alternate transaction log for each replica 30, if employed, in which case they are always enabled), so no special actions are required to deal with triggers while the data repair actions are being carried out.

c. The repaired database replica 30 is brought on-line again (i.e. is made active) within the cluster 1.

Tagging Related Data Changes in a Transaction Log with a Unique Request Identifier After a database replica 30 in the cluster 1 has completed a particular transaction request, denoted T1, submitted by the cluster controller 40 to the database replica 30, the transaction log monitoring subsystem 90 of the cluster controller 40 may find it difficult to identity the data content changes recorded in the transaction log of the database replica 30 that pertain exclusively to the completed transaction request T1, for the following reasons: (a) When the transaction request T1 was submitted to the database replica 30, the replica 30 may already be processing other transactions, and/or, (b) while the transaction request T1 was being processed by the database replica 30, one or more additional transaction requests were submitted to the replica 30. For both of the conditions (a) and (b) identified above, if the transaction log monitoring subsystem 90 simply compares the state of the transaction log for the database replica 30 at the start and at the end of transaction T1, the identified data changes cannot be exclusively attributed to transaction T1, because one or more additional transactions were in progress while transaction T1 was running. This problem shall be termed the "parallel transaction logging conundrum".

One possible solution to the parallel transaction logging conundrum is to design the cluster controller 40 such that it allows each database replica 30 in the cluster to be processing only one transaction at any given time. The multiple database replicas 30 in the cluster 1 may each be processing a different single transaction at any given time. For example, the cluster controller 40 may have a queue of three transactions (identified as T1, T2 and T3) that are waiting to be processed by a particular database replica 30, identified as R1. Instead of submitting all three transactions to database replica R1 at the same time, the cluster controller 40 first submits transaction T1 to database replica R1, and does not submit transaction T2 to the same replica R1 until transaction T1 has completed on replica R1. Likewise, the cluster controller 40 does not submit transaction T3 to replica R1 until transaction T1 has completed on replica R1. In summary, for a given database replica 30 in the cluster 1, transactions are not executed concurrently.

An alternate solution to the parallel transaction logging conundrum is to add new functionality to the RDBMS software that runs within each database node 10 of the cluster 1, that allows the cluster controller 40 to readily determine the data content changes that are caused by a given transaction that is initiated by the cluster controller 40, even when a given database replica 30 may process multiple transactions at the same time.

The new functionality of the RDBMS software includes a scheme for tagging related data content changes in the RDBMS transaction log in order to make it easier to determine the exact data changes that are associated with a particular transaction. Also, taking advantage of this tagging scheme, a transaction submission protocol is described that allows the cluster controller 40 to readily determine all data changes that occur in a particular database 30 as a result of a particular transaction submitted by the cluster controller 40 to the RDBMS software running in database node 10.

In one embodiment, each time the RDBMS software in database node 10 receives a request to process a transaction that may potentially modify the data content of one of its databases 30, the RDBMS software generates a unique identifier that it uses to tag all of the associated data changes for the transaction in the RDBMS transaction log for the database 30. In the preferred embodiment, the unique identifiers generated by the RDBMS software have the following properties: (a) The generated identifiers are unique only within the context of a single database. Therefore, if a database node 10 hosts multiple databases 30, a separate set of unique identifiers will be maintained for each database 30 in the node 10. (b) For a given database 30, the unique identifiers comprise a series of integer numbers that starts at one; and, (c) For a given database 30, each new unique identifier is exactly one greater than the last unique identifier generated by the RDBMS software for the same database 30. This means that the generated series off unique identifiers for a given database would consist of the following series of numbers: 1, 2, 4, 5, 6, and so on. The unique identifiers would be of a data type such that they would never reach the maximum allowed value for the data type within the expected lifetime of the system; for example, a suitable data type for the unique identifiers would be 64-bit integers.

In general, within the context of a given database replica 30 managed by the cluster controller 40, the unique identifiers are a deterministic sequence, such that if the controller knows the rules for generating the deterministic sequence, the controller can predict what series of identifiers will be generated for a set of transactions submitted to the database replica. The integer series 1, 2, 3, 4, . . . is the simplest deterministic sequence that satisfies these conditions and will be used by way of an example.

Each time the RDBMS software receives a new request to process a transaction. the unique transaction identifier generated by the RDBMS software is made available to the client node that submitted the transaction request to the RDBMS transaction processing software. In an equal-peer database cluster 1, it is desirable that the cluster controller 40 be the only client node that submits transaction requests directly to each database node 10 in the cluster 1, and it performs this function on behalf of various external client nodes 50 that exist outside of the cluster 1.

As a means of tracking the client origin of each transaction that causes a data-change record to be logged in the RDBMS transaction log, the identity of the client system that submitted the transaction request that caused a given data change to occur is also recorded with each log entry in the RDBMS transaction log. This client identification information augments the previously-described unique transaction identifiers that also tag each record in the RDBMS transaction log. For a given client system, the client identifier will be a unique identifier that is generally persistent over the entire life of the client system. For example, the IP (Internet Protocol) Address of the client system could be used for the client identifier.

It should be noted that the possibility also exists that an external client node 50 may submit a transaction request directly to a database node 10, without involvement of the cluster controller 40, but this is not a desirable situation, since transactions must be managed by the cluster controller 40, in order for the cluster controller to know the exact state of each database replica 30. Likewise, for some RDBMS software products it is possible to define transactional jobs possibly scheduled, that are managed internally by the RDBMS software that runs within each database node 10. This arrangement is equivalent for the purposes of this discussion to the situation where a transaction request is submitted to a database node 10 by an external client node 50, without involvement of the cluster controller 40.

In a master/slave database cluster 1, it is desirable that the cluster controller 40 be the only client node that submits transaction requests directly to the master database node 70 in the cluster 1, and it performs this function on behalf of various external client nodes 50 that reside outside of the cluster 1.

In the preferred embodiment of the master/slave database cluster 1, the cluster controller 40 is also responsible for directly managing the replication of data content changes from the master database node 70 to each slave database node 80 in the cluster 1. This is accomplished by the cluster controller 40 being directly responsible for submitting replication transaction requests to each slave database node 80 in the cluster 1, on behalf of the master database node 70. According to this design, the cluster controller 40 represents the only client node for all transaction requests processed by both the master database node 70 and by the slave database nodes 80 in the cluster 1. In an alternate embodiment the master database node 70 is made directly responsible for submitting replication transaction requests to each slave database node 80 in the cluster 1, but the master database node 70 communicates all transaction status information obtained from the RDBMS transaction processing software running within in each slave database node 80 back to the cluster controller 40 for analysis.

As described previously for equal-peer database clusters, the following also applies for master/slave cluster architectures. The possibility exists that an external client node 50 may submit a transaction request directly to a database node 10, without involvement of the cluster controller 40, but this is not a desirable situation, since transactions must be managed by the cluster controller 40, in order for the cluster controller 40 to know the exact state of each database replica 30. Likewise, for some RDBMS software products it is possible to define transactional jobs, possibly scheduled, that are managed internally by the RDBMS software that runs within each database node 10. This arrangement is equivalent for the purposes of this discussion to the situation where a transaction request is submitted to a database node 10 by an external client node 50, without involvement of the cluster controller 40.

By way of example, four typical types of transaction requests that would commonly be submitted by the cluster controller 40 to the RDBMS transaction processing software running in a database node 10 will be considered: (1) SQL update commands; (2) SQL insert commands; (3) SQL delete commands; and (4) requests to execute stored procedures that consist of any combination of SQL update, insert, and delete commands. For the purposes of the example, it will be assumed that all four of the example transaction requests apply to a single database replica 30.

For the purposes of the example it is assumed that the first transaction request T1 received by newly installed/initialized RDBMS software running in a database node 10 was an SQL update statement, and this statement caused three database table records to be updated. Upon receiving the transaction request T1 from the cluster controller 40, the RDBMS software would generate and provide back to the cluster controller 40 the unique transaction identifier "1". Then, after the transaction was completed the RDBMS transaction log for the affected database replica 30 in the database node 10 would contain three data-change records as represented in the following example:
<Transaction ID=1>, <Client ID>, <Update details for table record A>
<Transaction ID=1>, <Client ID>, <Update details for table record B>
<Transaction ID=1>, <Client ID>, <Update details for table record C>

Furthermore, having knowledge of the unique transaction identifier (i.e. 1) associated with completed transaction T1, the cluster controller 40 could readily extract the three update detail records for transaction T1 from the RDBMS transaction log simply by selecting records for which <Transaction ID=1>.

Second, assume that the second transaction request T2 received by the database node 10 was an SQL insert statement, and this statement caused one new database table record to be created. Upon receiving the transaction request T2 from the cluster controller 40, the RDBMS software would generate and provide back to the cluster controller 40 the unique transaction identifier "2". Then, after the transaction was completed, the RDBMS transaction log for the affected database replica 30 in the database node 10 would contain one data-change record as represented in the following example:
<Transaction ID=2>, <Client ID>, <Insert details for table record D>

Furthermore, having knowledge of the unique transaction identifier (i.e. 2) associated with completed transaction T2, the cluster controller 40 could readily extract the single insert detail record for transaction T2 from the RDBMS transaction log simply by selecting records for which <Transaction ID=2>.

Third, assume that the third transaction request T3 received by the database node 10 was an SQL delete statement, and this statement caused two existing database table records to be deleted. Upon receiving the transaction request T3 from the cluster controller 40, the RDBMS software would generate and provide back to the cluster controller 40 the unique transaction identifier "3". Then, after the transaction was completed, the RDBMS transaction log for the affected database replica 30 in the database node 10 would contain two data-change records as represented in the following example:
<Transaction ID=3>, <Client ID>, <Delete details for table record E>
<Transaction ID=3>, <Client ID>, <Delete details for table record F>

Furthermore, having knowledge of the unique transaction identifier (i.e. 3) associated with completed transaction T3, the cluster controller 40 could readily extract the two delete detail records for transaction T3 from the RDBMS transaction log simply by selecting records by which <Transaction ID 3>.

Fourth, assume that the fourth transaction request T4 received by the database node 10 was a stored procedure, and this procedure caused two existing database table records to be deleted, and two new database table records to be created. Upon receiving the transaction request T4 from the cluster controller 40, the RDBMS software would generate and provide back to the cluster controller 40 the unique transaction identifier "4". Then, after the transaction was completed, the RDBMS transaction log for the affected database replica 30 in the database node 10 would contain four data-change records as represented in the following example:
<Transaction ID=4>, <Client ID>, <Delete details for table record G>
<Transaction ID=4>, <Client ID>, <Delete details for table record H>
<Transaction ID 4>, <Client ID>, <Insert details for table record I>
Transaction ID=4>, <Client ID>, <Insert details for table record J>

Furthermore, having knowledge of the unique transaction identifier (i.e. 4) associated with completed transaction T4, the cluster controller 40 could readily extract the two delete detail records and the two insert detail records for transaction T4 from the RDBMS transaction log simply by selecting records for which <Transaction ID=4>.

For a given database replica 30, the above-illustrated protocol of: (a) having the RDBMS software assign a unique incrementing transaction identifier to each transaction request; (b) having the RDBMS transaction processing software tag each resulting data-change record in the RDBMS transaction log with the aforementioned transaction identifier; and, (c) having the RDBMS software make the aforementioned transaction identifier available to the client application (i.e. the cluster controller 40) that submitted the transaction quest associated with the transaction identifier, makes it straightforward for the cluster controller 40 to determine what data changes were caused by a particular completed transaction request by inspection of the applicable RDBMS transaction log.

In the following discussion the RDBMS software has implemented a writeset extraction mechanism including a client interface, whereby each client application of a database node 10 can obtain the exact details of all data changes for a particular transaction (including the client identifier) for a particular database 30, by requesting these details from the RDBMS software rather than having to determine the data change details by direct inspection of the RDBMS transaction log of the database 30.

As a preferred embodiment, the following design of a writeset extraction system and associated client interface allows a particular client application, such as the cluster controller 40, to obtain the complete details of all data changes that apply for any completed transaction $T_x$ (i.e. the writeset for transaction $T_x$) for a given database 30 residing in a database node 10, as long as the pertinent writeset data still exist in the database 30 and/or in the RDBMS transaction log for database 30. The design employs the previously described mechanism of associating each transaction request from a client application with a unique, incrementing identifier (i.e. the transaction identifier).

The behaviour of the writeset extraction system can be described as follows:
  a. A client application (for example, the cluster controller 40) submits a transaction request T1 to the RDBMS software residing in a database node 10. This transaction request applies to a particular database 30 residing in database node 10.
  b. The unique transaction identifier (ID_T1) associated with transaction T1 is made immediately available to the client application.
  c. The transaction request T1 is completed by the RDBMS software residing in the database node 10.
  d. The client application can now request the RDBMS software residing in database node 10 to execute a writeset extraction function for transaction T1. This is accomplished by having the client application pass the transaction identifier, ID_T1, to the RDBMS software application as an argument of the applicable writeset extraction function, for example get_writeset_by_id (ID_T1) where get_writeset_by_id is the function that is made available by the RDBMS software API. The client application must also specify for which database 30 in the database node 10 the writeset extraction is to be performed.
  e. The client application can obtain the writeset content for any other completed transaction by passing the unique transaction identifier for the transaction, along with the name of the target database 30, to the RDBMS software application residing in database node 10.

The RDBMS software application residing in database node 10 should be able to process the following functions related to writeset extraction:
  a. Provide the minimum transaction identifier for which writeset data are available (e.g. get_minimum_used_ws_id). The scope of this function is across all client sessions, for a given database 30.
  b. Provide the maximum transaction identifier for which writeset data are available (e.g. get_maximum_used_ws_id). The scope of this function is across all client sessions, for a given database 30.
  c. Provide the last-generated transaction identifier for a given client session (e.g. get_last_ws_id_for_session), for a given database 30.
  d. Provide data changes associated with the provided transaction identifier (e.g. get_writeset_by_id), for a given database 30.

As a further means of illustrating the behaviour of the new transaction tagging protocol, assume that the cluster controller 40 of a database cluster 1 is performing its designated role as a proxy client on behalf of a set of distributed client nodes 50 interacting with a database cluster 1 configured in an equal-peer architecture.

Each time the cluster controller 40 submits a new transaction request to the RDBMS software for execution against a particular database replica 30, R1, the transaction identifier for the replica R1 will be incremented by one. Thus, if the controller 40 finds that the RDBMS software returns a transaction identifier that changes by more than one from the highest previous transaction identifier known to the controller 40, this an indication that one or more transactions (termed "non-controlled transactions") have been executed against the replica R1 that did not originate from the controller 40.

For the case where one or more transactions have been executed against the replica R1 that did not originate from the controller 40, the controller 40 can identify the data changes in replica R1 associated with the non-controlled transactions as follows:
  a. Let ID_Last_Controlled be the transaction identifier for the most recent transaction submitted by the controller 40 to replica R1. The transaction identifier ID_Last_Controlled-1 is not associated with the controller 40, and is a non-controlled transaction.
  b. Let ID_Prior_Controlled be the transaction identifier for the second-most recent transaction submitted by the controller 40 to replica R1.
  c. The set of transaction identifiers for the most-recent non-controlled transactions, {ID_Last_Non_Controlled}, are those that satisfy the following condition:

ID_Prior_Controlled<{ID_Last_Non_Controlled}<ID_Last_Controlled d. Finally, the controller 40 can extract data-change details from the RDBMS transaction log for the set of transaction identifiers {ID_Last_Non_Controlled} for the last set of non-controlled transactions. Alternatively, if the RDBMS transaction processing software has implemented a writeset extraction mechanism with a suitable a client interface, such as the one described earlier, the controller 40 may employ this interface to obtain the data-change details for the last set of non-controlled transactions by calling the writeset extraction function, get_writeset_by_id (ID), for each transaction identifier, ID, in the set {ID_Last_Non_Controlled}.

By providing the cluster controller 40 with the ability to exactly identify data changes in database replicas 30 associated with non-controlled transactions the controller 40 is provided with additional options for dealing, with any non-controlled transactions that may occur. For example, the cluster may be configured such that non-controlled transactions are tolerated in the database cluster 1 as long as the resulting data changes are consistent across all replicas 30 in the cluster 1, and the cluster controller 40 takes into account the non-controlled transactions when considering how transactionally up-to-date each replica 30 is within the cluster 1. As a second alternative, a strict policy may be enforced where non-controlled transactions are not tolerated, and all data chances associated with non-controlled transactions are reversed in the database replicas 30 where they occur. As a third possible alternative, one database replica 30 may be designated as allowing non-controlled transactions, and all resulting uncontrolled data changes are subsequently replicated from the designated replica to the other database replicas in the cluster 1.

With respect to the definition of the term "transaction" as it applies to transaction identifiers, a transaction may consist of, but is not limited to, the following types of client-submitted actions in an SQL-based database:

i. A single SQL update statement
    ii. A single SQL insert statement
    iii. A single SQL delete statement
    iv. A combination of SQL update, insert, and delete statements that are submitted to the RDBMS software in a single batch by the client application
    v. A single execution of a stored procedure or prepared statement
    vi A combination of SQL commands that involve SQL update, insert and delete statements, and one or more executions of stored procedures and/or prepared statements, all submitted as a single batch by the client application With respect to the transaction identifiers that are returned to the client application (i.e. to the cluster controller 40) by the RDBMS software one of the following two cases may be implemented by the RDBMS software:

i. The RDBMS software may associate a separate transaction identifier with each distinct SQL statement that causes data to be modified in a database 30. Any number of transaction identifiers may be provided back to the client application depending on the number of SQL statements.
    ii. Alternatively, the RDBMS software may assign a single transaction identifier to multiple SQL statements that are submitted to the RDBMS software as a single batch of statements by the client application. For example a stored procedure may execute many individual update, delete, and insert statements when it is executed but the RDBMS software will associate a single transaction identifier with all data changes that result from a single execution of the stored procedure. In this case, a single transaction identifier is provided back to the client application.

In general, a single transaction identifier for a logically related batch of SQL statements is preferable for the purposes of this invention, for the following reasons:

a. For the purpose of tracking the transaction identifiers returned by the RDBMS software which allows the client application to determine all data changes in a database replica 30 associated with a given transaction, via its transaction identifier it is preferable to have a one-to-one relationship between each transaction identifier and the transactional units of work managed by the client application, which are generally batches of one or more related SQL statements, possibly including stored procedures and/or prepared statements. It is generally less complicated for the controller to track multiple identifiers than a single identifier for a transaction     b. For the purpose of identifying data changes in a replica 30 due to transactions that did not originate from the cluster controller 40.
    c. For helping to determine which transactions completed successfully during network interruptions or software errors that cause the cluster controller 40 to lose connectivity to one or more RDBMS software instances for one or more database replicas 30, while transaction requests are being processed.

With respect to item (c) above consider the following example:

a. Assume that the transaction identifier for the last transaction submitted by the cluster controller 40 to a database replica 30, R1, is ID_Last_Submitted. This transaction identifier is known to the controller 40.
    b. Then, the cluster controller 40 submits a new transaction request to replica R1, but a fault occurs that stops the controller 40 from communicating with the RDBMS software for replica R1. In addition, for the purposes of the example, the cluster controller 40 only submits a new transaction request to replica R1 after it has successfully received the transaction identifier for the previously submitted transaction request to replica R1, which occurs as soon as the previous transaction request is submitted to the RDBMS software for replica R1.
    c. When the cluster controller 40 re-establishes a connection with the RDBMS software for replica R1, it can examine the RDBMS transaction log to determine the last transaction identifier (and associated client identifier) with data changes in the log. If the last transaction identifier is ID_Last_Submitted, and the client identifier is that for the cluster controller 40, then it can be assumed that the transaction request from step (b) was never processed, and the request can be re-submitted to replica R1. On the other hand, if the last transaction identifier is one greater than ID_Last_Submitted, and the client identifier is that for the cluster controller 40, then it can be assumed that the transaction request from step (b) was processed for replica R1. If the RDBMS software associates a separate transaction identifier with each distinct SQL statement that may cause data to be modified in a database 30 the cluster controller 40) may not know how many identifiers to expect for a particular transaction request (there may be many), and the above scheme is not feasible.
    d. Alternatively, if the RDBMS transaction processing software has implemented a writeset extraction mechanism with a suitable a client interface, such as the one described earlier, the controller 40 may employ this interface to exercise the logic of step (c): (1) First, call the function get_maximum_used_ws_id. (2) If the returned transaction identifier equals ID_Last_Submitted, and the client identifier is that for the cluster controller 40, then it can be assumed that the transaction request from step (b) was never processed, and the request can be re-submitted to replica R1. (3) On the other hand, if the returned transaction identifier is one greater than ID_Last_Submitted, and the client identifier is that for the cluster controller 40, then it can be assumed that the transaction request from step (b) was processed for replica R1.

When a transaction identifier is used to identify the data changes associated with a particular transaction that is applied to multiple database replicas 30 in a cluster 1, it is also necessary to consider the ordering of the data changes in each RDBMS transaction log for different transaction identifiers. For example, consider the situation where two concurrent transactions will update the same database records in a given database replica 30, and this process is occurring in two different replicas 30 at the same time. R1 and R2. For database replica R1, transaction T1 is assigned the transaction identifier "1", and transaction T2 is assigned the transaction identifier "2", and likewise for replica R2.

Furthermore, transaction T1 updates a field F in a table record to the value X1, and T2 updates the same record and field F to the value XN, and likewise in replica R2.

Finally it is found that in replica R1, the RDBMS transaction log record for transaction T1 occurs before that for transaction T2, however, in replica R2, the RDBMS transaction log record for transaction T1 occurs after that for transaction T2. Therefore, although transaction T1 caused the same data change to occur in both replicas R1 and R2, and likewise for transaction T2, replicas R1 and R2 have different values for the field F, because transactions T1 and T2 were processed in different orders in replicas R1 and R2. Therefore in addition to verifying that each transaction causes consistent data changes to occur in the various database replicas 30 in the cluster 1, on a transaction by transaction basis, it is also necessary to verify that all updates applied to a particular table record occur in the same sequential order between replicas.

Database History Files

In some database systems, a database history file logs details regarding actions that are performed against the associated database. These actions may include loading a table through a means that is not logged as a transaction, data is reorganized within a table, or a table is created, renamed or deleted.

If a particular database management system that is employed within a shared-nothing cluster does support the history file feature, then the history file can also be used to help monitor for structural or data content inconsistencies between database replicas in the shared-nothing database cluster architecture. In a preferred embodiment of the invention, a history file monitoring subsystem 100 monitors the history file for each database replica in each database node 11 in the cluster 1.

In the preferred embodiment the history file monitoring subsystem 100 operates at the cluster controller 40 and monitors the contents of the database history file for each database replica 30 within each database node 10 of the cluster 1. For each change in the database history file, the history file monitoring subsystem 100 determines whether the change reflects data content changes or structural changes within the database replica 30U Note that structural database changes are considered to include the creation of new tables, the renaming of an existing table, and the deleting of an existing table.

If history file monitoring subsystem 100 detects a structural change for an on-line (active) database replica 30, it sends a notification message to cluster controller 40. Possible remedial actions that may be initiated by cluster controller 40 upon receipt of the notification message include:

a. maintaining the affected database replica as off-line until all other corresponding database replicas in the cluster have been similarly modified; or
 b. sending a notification event to the operational console of the cluster system, and optionally to other enterprise monitoring systems.

If a database replica 30 is taken off-line by the cluster controller 40 in response to a structural change, as detected by the history file monitoring subsystem 100, a human operator would have the option of manually bringing the database replica back on-line within the database cluster.

If the history file monitoring subsystem 100 detects a structural change for an off-line (inactive) database replica, it preferably sends a notification message to the cluster controller 40. Possible remedial actions that may be initiated by the cluster controller 40 upon receipt of the notification message include:

a. keeping the affected database replica off-line until all other corresponding database replicas in the cluster have been similarly modified; or
 b. sending a notification event to the operational console of the cluster system, and possibly to other enterprise monitoring systems.

If the history file monitoring subsystem 100 detects a non-logged load of data into a particular table for an on-line (active) or off-line (inactive) database replica, it sends a notification message to the cluster controller 40. Possible remedial actions that may be initiated by the cluster controller upon receipt of the notification message include: a) taking the affected database replica off-line until all other corresponding database replicas in the cluster have been similarly modified, or b) sending a notification event to the operational console of the cluster system, and optionally to other enterprise monitoring systems. If the affected database is automatically taken off-line within the cluster, the cluster controller 40 may keep the database off-line until a row-by-row comparison of data in the affected table has been performed between the various database replicas in the cluster. An inter-database table comparison may be automatically triggered by a logical rule such as all database replicas 30 in the cluster 1 being subject to a similar non-logged load of table data within a particular time frame, or may be manually triggered at the discretion of a human operator.

It is understood that the history file monitoring subsystem 100 can be custom configured such that certain types of cross database discrepancies detected by the history file monitoring subsystem 100 are ignored. For example, it may be acceptable to ignore discrepancies that apply to certain database tables since they are considered to have no significant impact on the overall data integrity of the database cluster. Which types of cross database discrepancies are ignored may be configurable and persisted between restarting of the database nodes and cluster.

If particular database software does not generate a suitable database history file for the purposes described above, an alternative technique may be available to the purposes of this invention. The cluster controller may monitor system tables within each of the database nodes 10. The system tables, depending on the specific implementation of the database software, generally maintain management information regarding the structure of tables within the database. By monitoring the system tables, the cluster controller or a monitoring subsystem may detect changes to data tables, triggers, stored procedures and other structural attributes of the database.

In a further alternative, triggers may be associated with the system tables of the database. The triggers may then be used to detect changes to the system tables that correspond to structural changes within the database. As described earlier in relation to the alternative transaction log, a similar alternative database history log can be produced by using triggers associated with the system tables of the database.

Various embodiments of the present invention has mg been thus described in detail by way of example, it will be apparent to those skilled in the art that variations and modifications may be made without departing from the invention. The invention includes all such variations and modifications.

I claim:

1. A system for monitoring and maintaining data consistency comprising:
   a plurality of database nodes each capable of operating independently each containing at least one database;
   a transaction log for recording each insertion deletion or modification of data for each of the at least one databases in the database nodes;
   a controller node in communication with the database nodes that can receive a series of database transaction requests from a client and that sends the series of database transaction requests to the plurality of database nodes and monitors the results of each of the series of database transaction request at each of plurality of database nodes for inconsistencies and when inconsistencies are detected for a database transaction request, determining the change made by the database transaction request in each of the plurality of database nodes by i) identifying the change made by the majority of the database nodes: ii) making each of the plurality of database nodes identified as not consistent with the majority, inactive; ii) applying changes to in each of the plurality of database nodes not conforming to the majority to cause the change made in the majority of the database nodes to be made in each of the plurality of database nodes not conforming to the majority; iv) making each of the plurality of the database nodes previously identified as not consistent with the majority, active;
   whereby the database nodes are kept consistent.

2. The system of claim 1 wherein the controller node identifies the change made by one of:
   a) the active database node that first completed the transaction request,
   b) the active database node that has completed the most transaction requests, and
   c) the active database node that is the most authoritative,
   when the change made by the majority of the database nodes can not be determined.

3. A method for monitoring and maintaining data consistency between a plurality of database nodes each containing at least one database, comprising the steps of:
   a) receiving at least one database transaction request from at least one client node;
   b) applying the at least one database transaction request from the at least one client node to all of the database nodes;
   c) monitoring the plurality of database nodes and detecting inconsistencies in the results of each of the at least one database transaction request between the plurality of database nodes;
   d) when inconsistencies are detected for a database transaction request, determining the chance made by the database transaction request in each of the plurality of database nodes by
      i) identifying the change made by the majority of the database nodes;
      ii) making each of the plurality of database nodes identified as not consistent with the majority, inactive;
      ii) applying changes to in each of the plurality of database nodes not conforming to the majority to cause the change made in the majority of the database nodes to be made in each of the plurality of database nodes not conforming to the majority;
      iv) making each of the plurality of the database nodes previously identified as not consistent with the majority, active.
   whereby the database nodes are kept consistent.

4. The method of claim 3 further comprising completing step iv) if each of the plurality of the databases nodes previously identified as not consistent with the majority has applied transaction requests applied by all the other of the plurality of the database nodes.

5. The method of claim 3 further comprising recording the inconsistency detected and the changes applied to each of the database nodes identified as not conforming to the majority.

6. The method of claim 3 wherein the step of identifying the change made by the majority of the database nodes is replaced by identifying the change made by one of:
   a) the active database node that first completed the transaction request,
   b) the active database node that has completed the most transaction requests, and
   c) the active database node that is the most authoritative.

7. The method of claim 3 wherein the step of identifying the change made by the majority of the database nodes is replaced by the step of identifying the change made by one of:
   a) the active database node that first completed the transaction request,
   b) the active database node that has completed the most transaction requests, and
   c) the active database node that is the most authoritative,
   when the change made by the majority of the database nodes can not be determined.

8. The method of claim 3 further comprising the step of, when inconsistencies are detected that do not correspond to any database transaction request,
   i) identifying the value of the inconsistent data in the majority of the database nodes;
   ii) making each of the plurality of database nodes identified as not consistent with the majority, inactive;
   iii) applying changes to in each of the plurality of database nodes not conforming to the majority to cause the change made in the majority of the database nodes to be made in each of the plurality of database nodes not conforming to the majority; and
   iv) making each of the plurality of the database nodes previously identified as not consistent with the majority, active.

9. The method of claim 8 further comprising the step of waiting a period of time after detecting the consistency and before identifying the value of the inconsistent data in the majority of the database nodes.

10. The method of claim 3 where the step of identifying the change made by the majority of the database nodes is replaced by the step of identifying the change made to a master database node.

* * * * *